United States Patent
Grosman et al.

(10) Patent No.: US 7,565,217 B2
(45) Date of Patent: Jul. 21, 2009

(54) TRAVERSAL OF EMPTY REGIONS IN A SEARCHABLE DATA STRUCTURE

(75) Inventors: Ronen Grosman, Thornill (CA); Gary Valentin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/096,900

(22) Filed: Apr. 1, 2005

(65) Prior Publication Data

US 2006/0224600 A1 Oct. 5, 2006

(51) Int. Cl.
*G06F 17/00* (2006.01)

(52) U.S. Cl. .................. 700/100; 707/8; 707/103 R; 717/138

(58) Field of Classification Search .......... None
See application file for complete search history.

(56) References Cited

U.S. PATENT DOCUMENTS

| | | | |
|---|---|---|---|
| 4,961,134 A | 10/1990 | Crus et al. | |
| 5,253,361 A | 10/1993 | Thurman et al. | |
| 5,408,652 A | 4/1995 | Hayashi et al. | |
| 5,440,732 A | 8/1995 | Lomet et al. | |
| 5,517,641 A | 5/1996 | Barry et al. | |
| 5,594,899 A | 1/1997 | Knudsen et al. | |
| 5,664,172 A | 9/1997 | Antoshenkov | |
| 5,687,361 A | 11/1997 | Sarkar | |
| 5,727,196 A | 3/1998 | Strauss, Jr. et al. | |
| 5,794,228 A | 8/1998 | French et al. | |
| 5,809,507 A * | 9/1998 | Cavanaugh, III | 707/103 R |
| 5,918,225 A | 6/1999 | White et al. | |
| 5,950,210 A | 9/1999 | Nelson | |
| 5,987,477 A | 11/1999 | Schmuck et al. | |
| 6,009,425 A | 12/1999 | Mohan | |
| 6,125,370 A | 9/2000 | Courter et al. | |
| 6,163,775 A | 12/2000 | Wlaschin et al. | |
| 6,216,212 B1 | 4/2001 | Challenger et al. | |
| 6,240,428 B1 | 5/2001 | Yeung et al. | |
| 6,289,336 B1 | 9/2001 | Melton et al. | |
| 6,298,338 B1 | 10/2001 | Melton et al. | |
| 6,338,056 B1 | 1/2002 | Dessloch et al. | |
| 6,411,964 B1 | 6/2002 | Iyer et al. | |
| 6,418,438 B1 | 7/2002 | Campbell | |
| 6,439,783 B1 | 8/2002 | Antoshenkov | |
| 6,457,000 B1 | 9/2002 | Witkowski et al. | |
| 6,470,330 B1 | 10/2002 | Das et al. | |
| 6,526,435 B1 | 2/2003 | Lippert | |
| 6,546,394 B1 | 4/2003 | Chong et al. | |

(Continued)

OTHER PUBLICATIONS

Mohlin ("New functions in DB2 UDB V8 for Linux, Unix & Windows" IBM DB2NYTT-Newsletter from IBM DB2 Information Management Software Sweden, Nov. 14, 2003).*

(Continued)

*Primary Examiner*—Tim T. Vo
*Assistant Examiner*—Jau-Shya Meng
(74) *Attorney, Agent, or Firm*—Konrad Raynes & Victor LLP; Rabindranath Dutta

(57) ABSTRACT

Provided are a method, system, and article of manufacture for the traversal of empty regions in a searchable data structure such as a table. A plurality of elements are allocated in logical storage, wherein the plurality of elements correspond to entries of the searchable data structure. An indicator is maintained corresponding to contiguously allocated empty elements in the plurality of elements. An operation is performed on the searchable data structure by avoiding the contiguously allocated empty elements.

15 Claims, 8 Drawing Sheets

U.S. PATENT DOCUMENTS

| | | | |
|---|---|---|---|
| 6,578,026 | B1 | 6/2003 | Cranston et al. |
| 6,591,269 | B1 * | 7/2003 | Ponnekanti ................. 707/100 |
| 6,631,366 | B1 | 10/2003 | Nagavamsi et al. |
| 6,732,199 | B1 | 5/2004 | Yu et al. |
| 6,792,432 | B1 * | 9/2004 | Kodavalla et al. ........... 707/102 |
| 6,859,808 | B1 | 2/2005 | Chong et al. |
| 6,931,390 | B1 | 8/2005 | Zait et al. |
| 7,174,331 | B1 * | 2/2007 | Luo et al. ...................... 707/8 |
| 2002/0147969 | A1 * | 10/2002 | Lethin et al. ................. 717/138 |
| 2004/0015478 | A1 | 1/2004 | Pauly |
| 2004/0225673 | A1 * | 11/2004 | Beck et al. .................. 707/102 |

OTHER PUBLICATIONS

Chang, J.M. and K.S. Fu, "A Dynamic Clustering Technique for Physical Database Design", © 1980 ACM, pp. 188-199.

Kulkarni, U.R. and H.K. Jain, "Using Semantic Knowledge in Partitioning and Allocation of Data in Distribution Databases", © 1991, IEEE, pp. 146-154.

Oracle Corporation, Managing Index-Organized Tables, Oracle8i Application Developer's Guide—Fundamentals, Release 8.1.5, A6800301 [online], © 1999 [Retrieved on Nov. 11, 2008]. Retrieved from the Internet at <URL:http://www.csee.umbc.edu/help/oracle8/server.815/a68003/01_07iot.htm>, 17 pp.

Silicon Graphics & Informix Software, Inc., "TPC Benchmark C Full Disclosure Report", Silicon Graphics and Informix Software, Inc., © 1997, 148 pp.

Stern, S.A., Oracle9i Index-Organized Tables, Technical Whitepaper [online], Sep. 2001. [Retrieved on Jan. 23, 2006]. Retrieved from the Internet at <URL: http://www.oracle.com/technology/products/oracle9i/pdf/iot_twp.pdf>, 11 pp.

* cited by examiner

TRAVERSAL OF EMPTY REGIONS IN A SEARCHABLE DATA STRUCTURE

BACKGROUND

1. Field of the Invention

The disclosure relates to a method, system, and article of manufacture for the traversal of empty regions in a searchable data structure, more specifically in a range clustered table.

2. Background

A range clustered table is a table whose data is tightly clustered across one or more columns in the table, i.e., range clustered tables may cluster rows in a table. In the table layout scheme of a range clustered table, each record in the table may have a predetermined record identifier which is an internal identifier used to locate a record in the table. Each record in a range clustered table has a predetermined offset from the logical start of the table, which allows rapid access to the data. As a result, data in range clustered tables can be accessed without needing an index. Range clustered tables are the subject of U.S. patent application Ser. No. 10/429,819 filed May 5, 2003 and entitled "Range-Clustered Tables in a Database Management System", which is incorporated by reference in its entirety.

Applications in which tightly clustered sequence key ranges are likely may use range clustered tables. A key may be used to generate the logical location of a row in a range clustered table. At table creation time, there are no records in the range clustered table. Space for the range clustered table is preallocated and reserved for use by the table even when records for the table are not filled in. The preallocation of the space for the range clustered table may be based on the record size and the maximum number of records to be stored in the range clustered table.

Range clustered tables have range scan capabilities that require a range scan of the table to examine every possible row which could exist in a query range. When a large number of empty rows exist in a range clustered table, range scanning capabilities may result in large amount of input/output (I/O) operations and locking in order to lock and traverse empty regions of the range clustered table.

SUMMARY OF THE DESCRIBED EMBODIMENTS

Provided are a method, system, and article of manufacture for the traversal of empty regions in tables. A plurality of elements are allocated in logical storage, wherein the plurality of elements correspond to entries of a searchable data structure. An indicator is maintained corresponding to contiguously allocated empty elements in the plurality of elements. An operation is performed on the searchable data structure by avoiding the contiguously allocated empty elements.

In certain additional embodiments, the searchable data structure is a range clustered table in a database.

In yet additional embodiments, the allocating of the plurality of elements further comprises preallocating space for the plurality of elements in the logical storage, and mapping empty entries of the searchable data structure to the contiguously allocated empty elements in the logical storage.

In further embodiments, the maintaining of the indicator further comprises storing a pointer to a first possible non-empty element of the allocated plurality of elements, wherein all elements allocated in a sequence before the first possible non-empty element are empty.

In yet further embodiments, the operation is an insertion operation, wherein the performing of the insertion operation further comprises determining whether a first element of the plurality of elements is locked. An exclusive lock is generated on the first element of the plurality of elements, in response to determining that the first element is not locked, wherein the exclusive lock exclusively locks the contiguously allocated empty elements starting from the first element. Data is inserted into one of the plurality of elements. The indicator is updated, in response to the inserting of the data.

In additional embodiments, the operation is a query operation, wherein the performing of the query operation further comprises determining whether a first element of the plurality of elements is locked. A shared lock is generated on the first element of the plurality of elements, in response to determining that the first element is not locked, wherein the shared lock locks the contiguously allocated empty elements starting from the first element for shared access. The indicator is used to avoid the contiguously allocated empty elements. The indicator is updated and a response is made to the query operation.

In yet additional embodiments, the operation is a deletion operation, wherein the performing of the deletion operation further comprises determining from the indicator a first possible non-empty element in the plurality of elements. A scanning is performed of the plurality of elements starting from the first possible non-empty element. Data corresponding to one element of the plurality of elements is deleted.

In further embodiments, a single element of the contiguously allocated empty elements is locked in order to lock all elements of the contiguously allocated empty elements.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof and which illustrate several embodiments. It is understood that other embodiments may be utilized and structural and operational changes may be made.

Certain embodiments provide a locking scheme along with an empty region traversal method to identify and bypass empty regions of range clustered tables.

Figure 1:
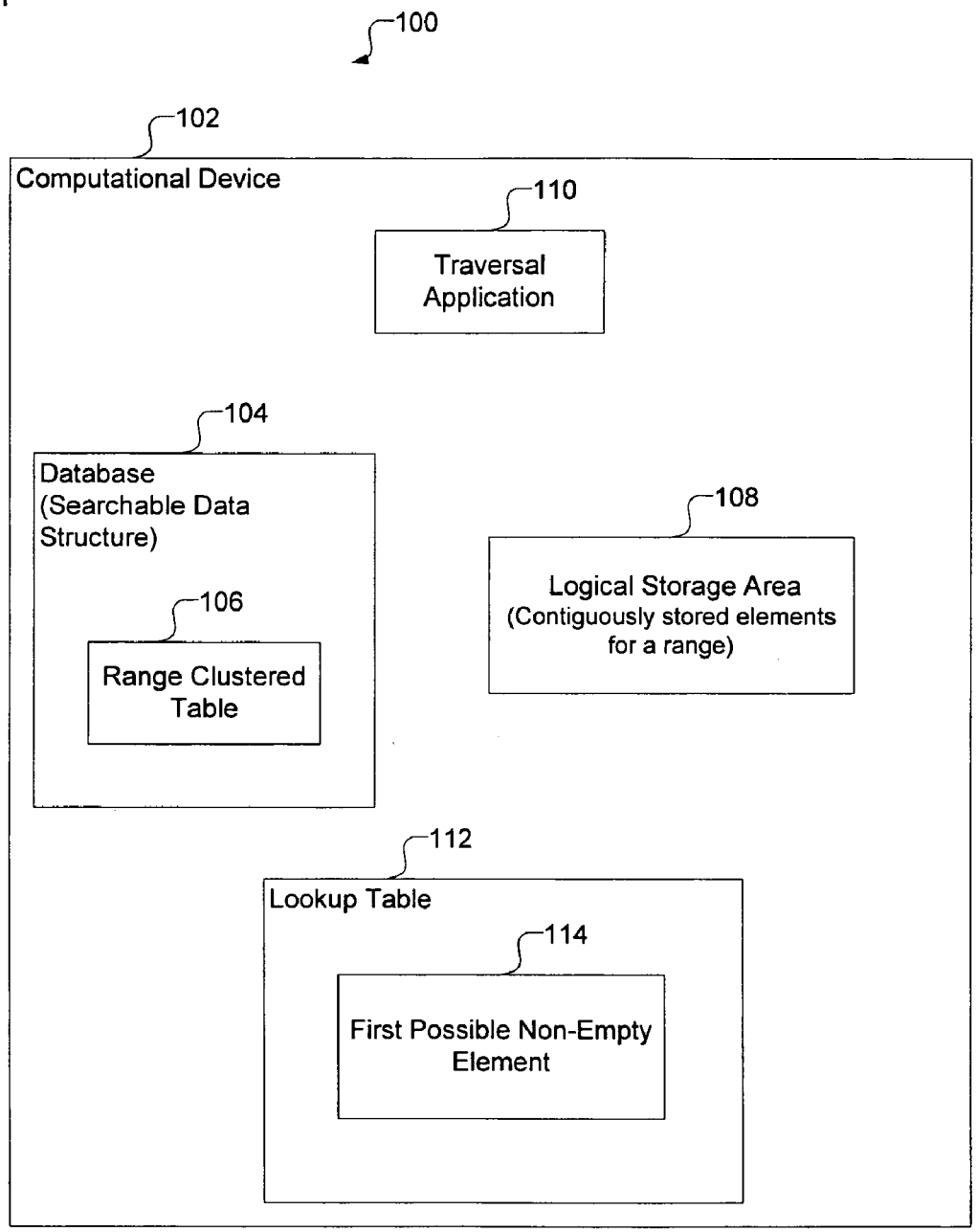
FIG. 1 illustrates a block diagram of a computing environment in accordance with certain embodiments.

FIG. 1 illustrates a block diagram of a computing environment 100 in accordance with certain embodiments. The computing environment 100 comprises a computational device 102 and a database 104 that includes a range clustered table 106.

The computational device 102 may be any suitable device including those presently known in the art, such as, a personal computer, a workstation, a server, a mainframe, a hand held computer, a palm top computer, a telephony device, a network appliance, a blade computer, a storage server, etc. The database 104 may include any suitable searchable data structure, where query ranges may be used to search the suitable searchable data structure. For example, in certain embodiments the database 104 may include the IBM® DB2® database. (IBM and DB2 are registered trademarks of IBM Corporation.)

The computational device 102 also includes a logical storage area 108, a traversal application 110, and a lookup table 112. The logical storage area 108 stores contiguous elements corresponding to a range or row of the range clustered table 106. The traversal application 110 is capable of performing insertions, deletions, queries and other database operations with respect to the range clustered table 106 of the database 104.

The traversal application 110 maintains the lookup table 112 in the computational device 102. The traversal application 110 ensures that for any range of the range clustered table 106, the traversal application 110 stores a pointer to the first possible non-empty element 114 stored in the logical storage area 108.

In certain embodiments, the traversal application 110 is capable of skipping over empty regions of the range clustered table 106 by using the lookup table 112 and the logical storage area 108.

Figure 2:
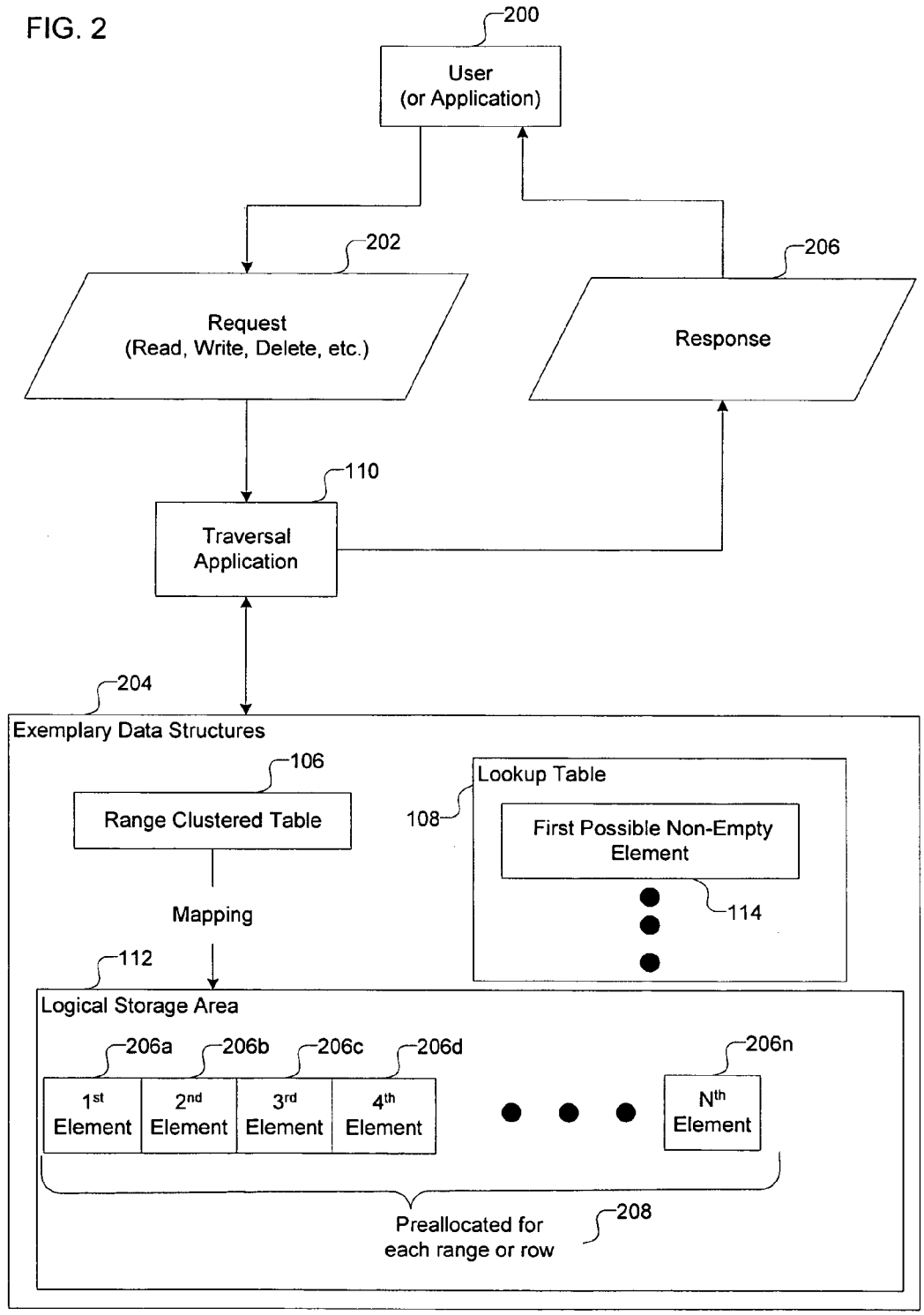
FIG. 2 illustrates a block diagram that shows how storage is preallocated in range clustered tables, in accordance with certain embodiments.

FIG. 2 illustrates a block diagram that shows how storage is preallocated for range clustered tables, in accordance with certain embodiments. A user application 200 may perform a request 202 to the traversal application 110 included in the computational device 102. The request 202 may include a read, write, delete or any other suitable database operation on the range clustered table 106.

In response to the request 202, the traversal application 110 interprets the request 202 and exchanges information with the exemplary data structures 204 that comprise the range clustered table 106, the lookup table 108 and the logical storage area 112 to generate a response 206 to the request 202.

The logical storage area 112 may include a sequence of elements 206a, 206b, 206c, 206d, . . . , 206n that have been preallocated (reference numeral 208) for each range or row of the range clustered table 106. While FIG. 2 illustrates a single exemplary sequence of elements 206a, . . . , 206n, in alternative embodiments, there may be a plurality of exemplary sequence of elements where each sequence of elements corresponds to a range or row of the range clustered table 106. The number of elements in the sequence of elements corresponding to different ranges or rows of the range clustered table 106 may be different.

The lookup table 108 may include pointers corresponding to the preallocated sequence of elements in the logical storage area 112. For example, the first possible non-empty element 114 may be a pointer to an element of the sequence of elements 206a, . . . , 206n. The lookup table 108 may include a plurality of pointers where each pointer points to a different sequence of elements in the logical storage area 112.

In certain embodiments, the traversal application 110 may skip over empty regions of the range clustered table 106 while generating the response 206 by using the first possible non-empty element 114 pointers stored in the lookup table 108.

Figure 3:
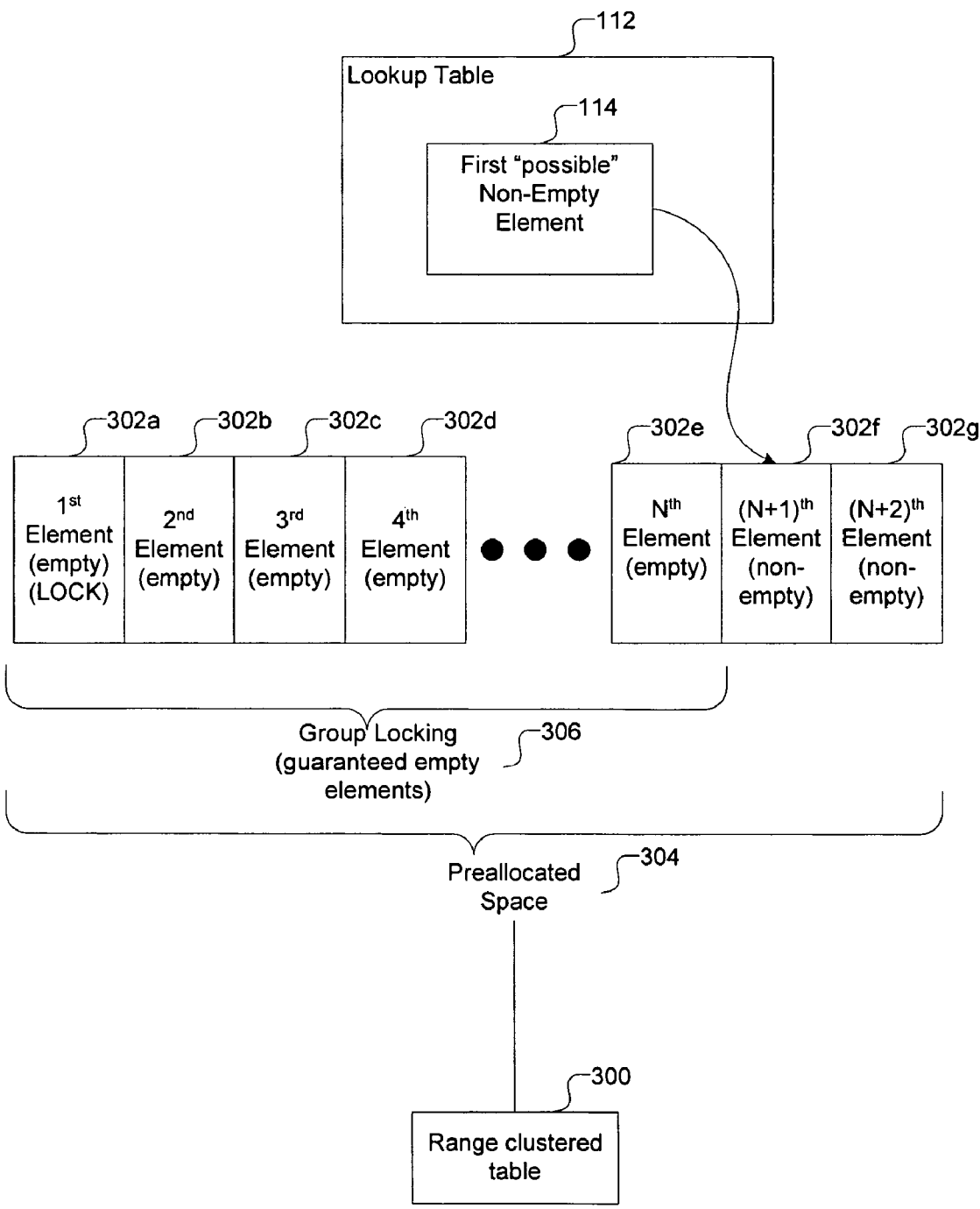
FIG. 3 illustrates a block diagram that shows how group locking is performed in a logical storage corresponding to a first exemplary range clustered table, in accordance with certain embodiments.

FIG. 3 illustrates a block diagram that shows how group locking is performed for a logical storage area 112 corresponding to a first exemplary range clustered table 300, in accordance with certain embodiments. The exemplary range clustered table 300 is an embodiment of the range clustered table 106.

Ranges or rows of the range clustered table 300 are stored in the exemplary sequence of contiguous elements 302a, 302b, 302c, 302d, 302e, 302f, 302g in the preallocated space 304 of the logical storage area 108. In certain embodiments, the exemplary sequence of elements 302a, . . . , 302e are empty and the exemplary sequence of elements 302f, 302g are non-empty.

In certain embodiments, the traversal application 110 causes the first possible non-empty element 114 of the lookup table 112 to point to the element 302f of the preallocated space 304. In such embodiments, the traversal application 110 guarantees that all elements from the start element 302a, i.e., the $1^{st}$ element 302a, to the element 302e, i.e., the $N^{th}$ element, are empty. The first possible non-empty element in the preallocated space 304 is the element pointed to by the first possible non-empty element 114 pointer. In the embodiment illustrated in FIG. 3 the first possible non-empty element 114 pointer points to a non-empty element 300f. However, in alternative embodiments the first possible non-empty element 114 pointer may point an empty element.

In certain embodiments, the traversal application 302 locks the $1^{st}$ element 302 and the locking of the $1^{st}$ element 302 causes a lock on all elements from the $1^{st}$ element to the $N^{th}$ element 302e, where the $N^{th}$ element 300e is the element just previous to the element 302f pointed to by the first possible non-empty element 114 pointer. Therefore, in certain embodiments a group locking 306 is performed on the elements 302a, . . . , 302e by locking the $1^{st}$ element 302a. In certain alternative embodiments, the group locking of the guaranteed empty elements 302a, . . . , 302e may be performed by locking some other element in the guaranteed empty elements 302a, . . . , 302e.

FIG. 3 illustrates an embodiment in which a locking of one element 302a in the range of elements 302a, . . . , 300g group locks 306 a range of guaranteed empty elements 302a, . . . , 302e. Since a range of guaranteed empty elements are locked, the traversal application 110 can skip over contiguous empty elements corresponding to the range cluster table 300.

Figure 4:
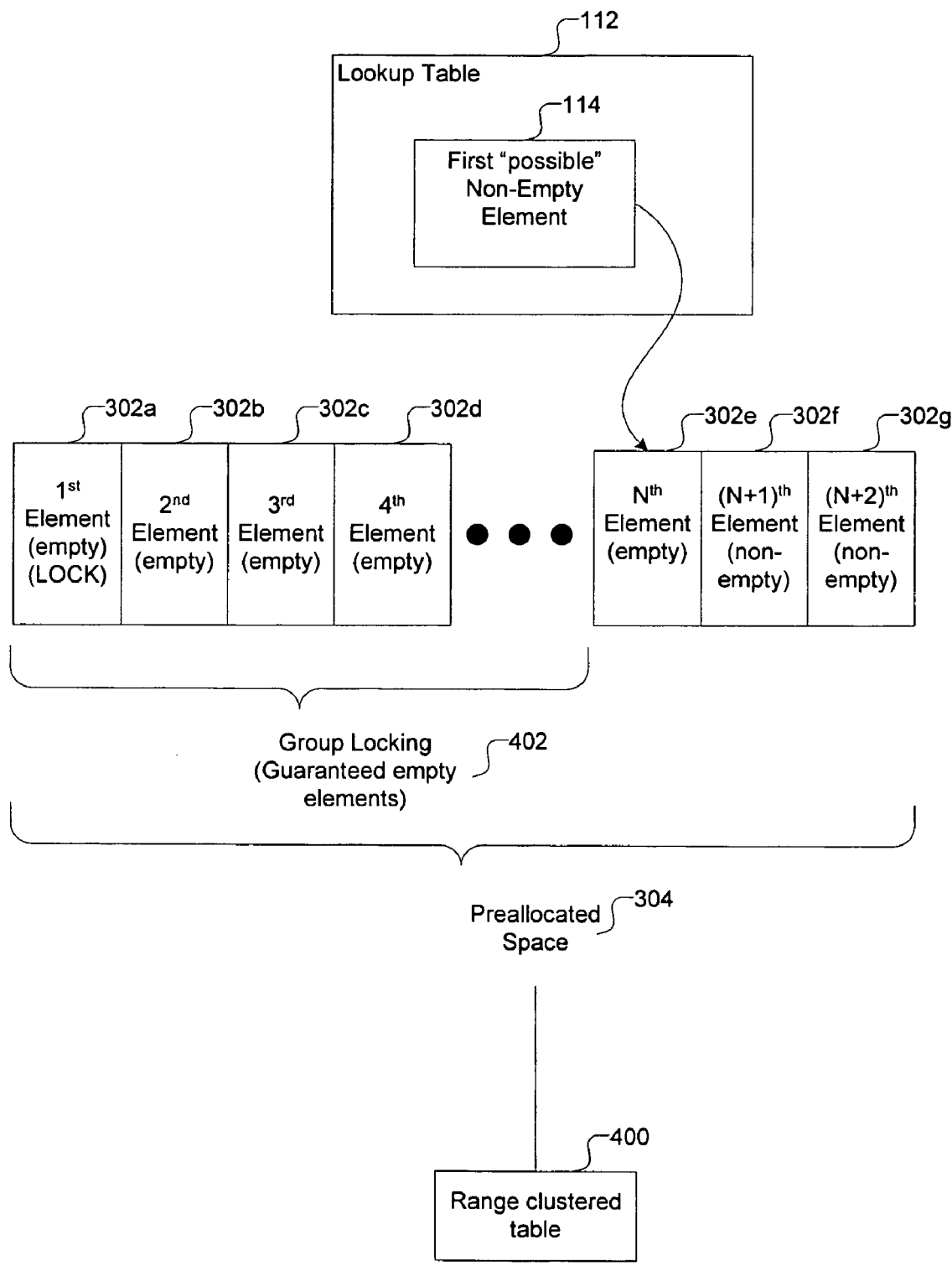
FIG. 4 illustrates a block diagram that shows how group locking is performed in a logical storage corresponding to a second exemplary range clustered table, in accordance with certain embodiments.

FIG. 4 illustrates a block diagram that shows how group locking is performed by the traversal application 110 in a second exemplary range clustered table 400, in accordance with certain embodiments.

Ranges or rows of the range clustered table 400 are stored in the exemplary sequence of contiguous elements 302a, 302b, 302c, 302d, 302e, 302f, 302g in the preallocated space 304 of the logical storage area 108. In certain embodiments, the exemplary sequence of elements 302a, . . . , 302e are empty and the exemplary sequence of elements 302f, 302g are non-empty.

In certain embodiments, the traversal application 110 causes the first possible non-empty element 114 of the lookup table 112 to point to the element 302e of the preallocated space. In such embodiments, the traversal application 110 guarantees that all elements from the start element 300a, i.e., the $1^{st}$ element 302a to the element stored just before the element 302e are empty. The first possible non-empty element in the preallocated space 304 is the element pointed to by the first possible non-empty element 114 pointer. In the embodiment illustrated in FIG. 4 the first possible non-empty element 114 pointer points to an empty element 300e. However, in alternative embodiments, such as the embodiment shown in FIG. 3, the first possible non-empty element 114 pointer may point a non-empty element. The first possible non-empty element 114 pointer guarantees that all elements of the sequence of elements 302a, . . . , 302g that are located before the element pointed to by the non-empty element 114 pointer are empty. The actual element pointed to by the non-empty element pointer may be empty or non-empty.

In certain embodiments, the traversal application 110 locks the $1^{st}$ element 302a and the locking of the $1^{st}$ element 302a causes a lock on all elements from the $1^{st}$ element 302a to the element just previous to the element 302e pointed to by the first possible non-empty 114 pointer. Therefore, in certain embodiments a group locking 402 is performed on the guaranteed empty elements 402 by locking the $1^{st}$ element 302a. In certain alternative embodiments, the group locking 402 of the guaranteed empty elements 402 may be performed by locking some other element in the guaranteed empty elements.

FIG. 4 illustrates an embodiment in which a locking of one element 302a in the range of elements 302a, . . . , 300g group locks 402 a range of guaranteed empty elements. Since a range of guaranteed empty elements are locked, the traversal application 110 can skip over contiguous empty elements corresponding to the exemplary range cluster table 400. In certain embodiments, requests are handled as part of a transaction and locking is used to enforce transactional consistency between different traversal applications.

Figure 5:
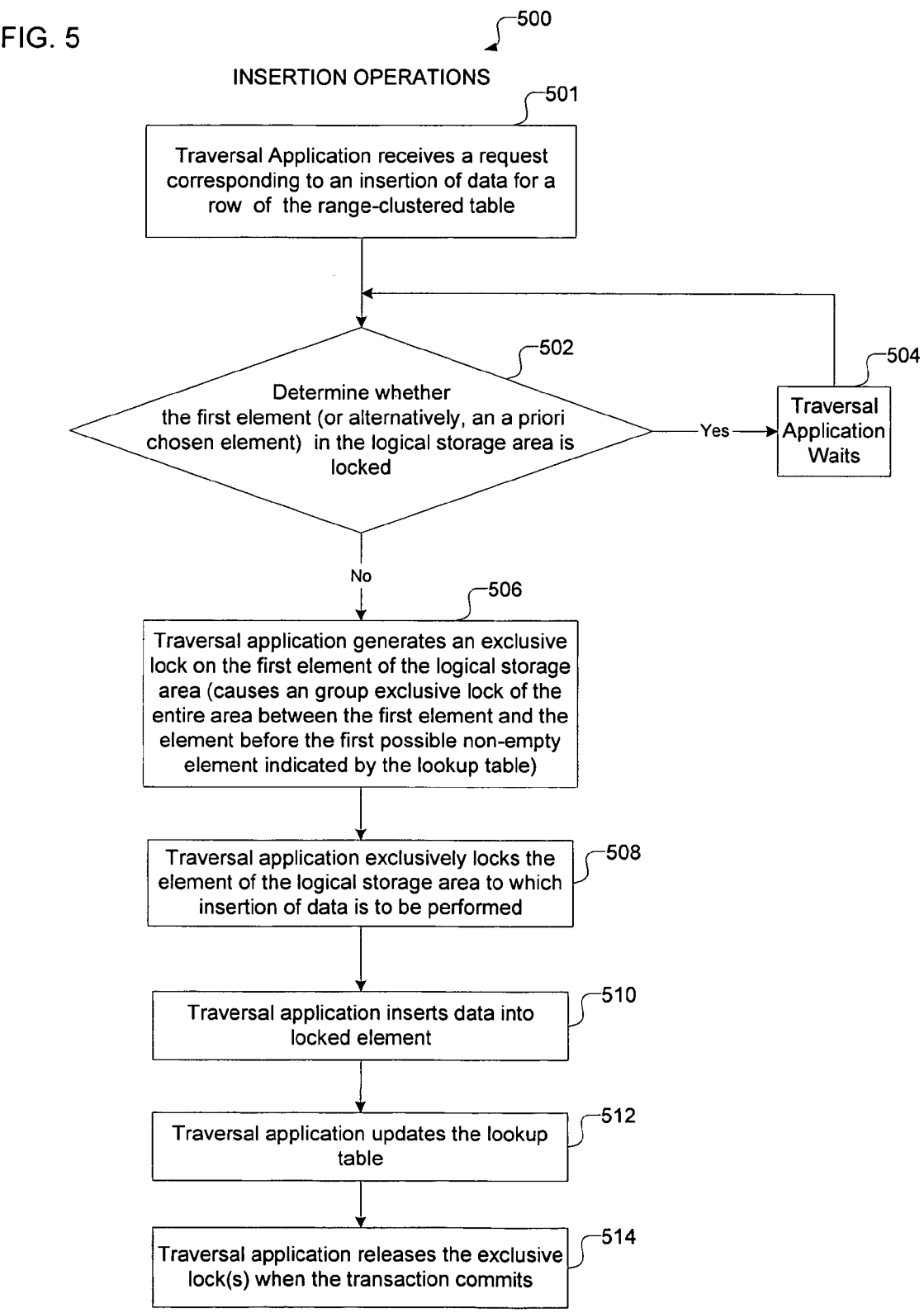
FIG. 5 illustrates operations for performing an insertion into a range clustered table, in accordance with certain embodiments.

FIG. 5 illustrates operations for an insertion into a range clustered table 106, in accordance with certain embodiments. The operations may be referred to as insertion operations 500 and may be implemented in the traversal application 110.

Control starts at block 500 where the traversal application 110 receives (at block 501) a request corresponding to an insertion of data for a row of the range clustered table 106. The traversal application 110 determines (at block 502) whether the $1^{st}$ element, such as element 206a or element 302a, in the logical storage area 108 is locked, where insertion of data is restricted to other requests. If so, the traversal application 110 waits (at block 504) and determines (at block 502) again whether the $1^{st}$ element in the logical storage area 108 is locked. In alternative embodiments, at block 502, an a priori chosen element may be used to check for exclusive locking If the $1^{st}$ element of the logical storage area 108 is not locked, then the traversal application 110 generates (at block 506) an exclusive lock on $1^{st}$ element of the logical storage area 108. The locking of the $1^{st}$ element causes an exclusive group locking (e.g., reference numerals 306, 402) of the entire area between the $1^{st}$ element and the element pointed to by the first possible non-empty element 114 of the lookup table 112. The exclusive group locking prevents other requests from accessing the exclusively locked elements.

The traversal application 10 exclusively locks (at block 508) the element of the logical storage area 108 to which insertion of data is to be performed. Subsequent to the locking, the traversal application 110 inserts (at block 510) data into the locked element.

Then the traversal application 110 updates (at block 512) the lookup table 112 to update the first possible non-empty 114 pointer. For example, if the insertion is into an element which was guaranteed to be empty then the first possible non-empty element 114 pointer is updated to point to the element in which data is inserted. The traversal application 110 releases (at block 514) the exclusive locks when the transaction commits.

FIG. 5 illustrates certain embodiments in which the traversal application 110 exclusively locks a plurality of guaranteed empty elements in the logical storage area 108 by locking a single element. After inserting data into an element the first possible non-empty element 114 pointer in the lookup table is updated 112. Since a plurality of contiguous empty elements are group locked via a locking of a single element, the traversal application 110 can potentially skip over these group locked elements while inserting data. Therefore, empty regions of the range clustered table 108 may be skipped over by the traversal application 110.

Figure 6:
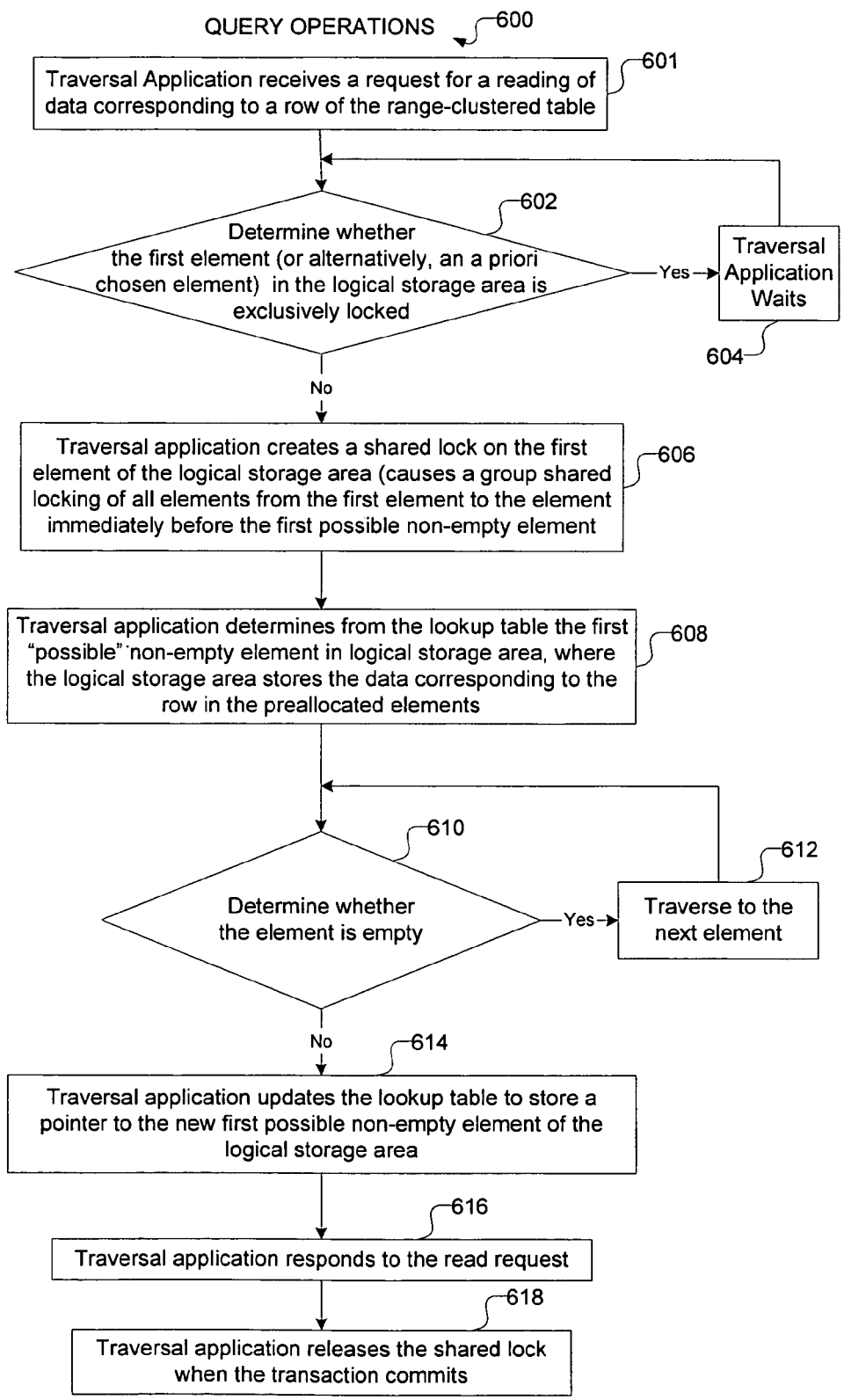
FIG. 6 illustrates operations for performing a query on a range clustered table, in accordance with certain embodiments.

FIG. 6 illustrates operations for performing a query on a range clustered table 106, in accordance with certain embodiments. The operations may be referred to as query operations 600 and may be implemented in the traversal application 110.

Control starts at block 601, where the traversal application 110 receives a request to read data corresponding to a row of the range clustered table 106. The traversal application determines (at block 602) whether the first element 206a, 302a in the logical storage area 108 is exclusively locked. If so, the traversal application 110 waits (at block 604) and attempts to determine once again whether the first element 206a, 302a in the logical storage area 108 is exclusively locked. In alternative embodiments, at block 602, an a priori chosen element may be used to check for exclusive locking.

If the traversal application 110 determines (at block 602) that the first element in the logical storage area 108 is not exclusively locked then the traversal application 110 creates (at block 606) a shared lock on the first element of the logical storage area 108. Creating a shared lock causes a group shared locking of all elements from the first element to the element immediately before the element pointed to by the first possible non-empty element 114 pointer. A shared locking allows other query operations to be satisfied, but no deletion or insertion operations may be performed on the locked elements.

The traversal application 110 determines (at block 608) from the lookup table 112 the first possible non-empty element in the logical storage area 108, where the logical storage area 108 has already stored the data for a row corresponding to the preallocated elements, such as, preallocated elements 206a, . . . , 206n, 302a, . . . , 302g where the query operations 600 are being performed on the row.

The traversal application 110 determines (at block 608) whether the first non-empty element is empty. Therefore, the traversal application 110 skips over all the group locked elements which are guaranteed to be empty. The processing time that may have been required to read each empty element is not used by the traversal application 110.

If the traversal application 110 determines (at block 610) that the element is empty, then the traversal application traverses (at block 612) to the next element and determines (at block 610) whether the next element is empty.

If the traversal application 610 determines (at block 610) that the element is non-empty, then the traversal application 610 updates (at block 614) the lookup table 112 to store the new pointer in the first possible non-empty element 114 pointer to the logical storage area 108.

The traversal application 110 responds (at block 616) to the read request with the data in the non-empty element and releases (at block 618) the shared lock when the transaction commits.

FIG. 6 illustrates certain embodiments in which the traversal application 110 skips over elements that are guaranteed to be empty while performing a query. On encountering a non-empty element, the traversal application 110 updates the lookup table 112, such that, the first possible non-empty element 114 pointer points to the encountered non-empty element.

Figure 7:
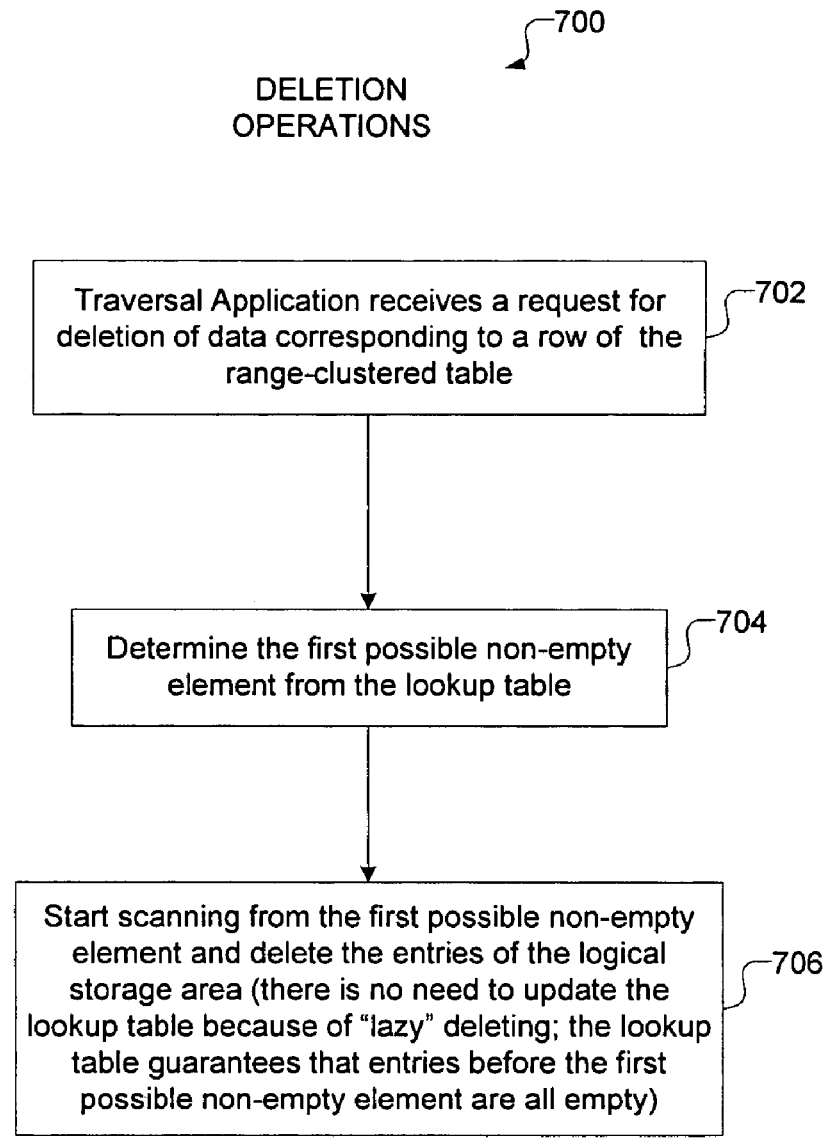
FIG. 7 illustrates operations for performing a deletion from a range clustered table, in accordance with certain embodiments.

FIG. 7 illustrates operations for a deletion from a range clustered table 106, in accordance with certain embodiments. The operations may be referred to as deletion operations 700 and may be implemented in the traversal application 110.

Control starts at block 702, where the traversal application 110 receives a request for deletion of data corresponding to a row of the range clustered table 106. The traversal application 110 determines (at block 704) the first possible non-empty element from the lookup table 112.

The traversal application starts scanning from the first possible non-empty element and deletes the corresponding entries of the logical storage area 106. While deleting entries there is no need to update the pointer to the first possible non-empty element 114 in the lookup table 112. The pointer to the first possible non-empty element 114 in the lookup table 112 merely guarantees that entries before the first possible non-empty element are all empty. Therefore, the pointer to the first possible non-empty element 114 is valid even when a non-empty element is deleted. In certain embodiments, the pointer to the first possible non-empty element 114 is updated while performing query operations on the range clustered table 106.

Therefore FIG. 7 illustrates an embodiment in which the traversal application 110 can skip over the guaranteed empty elements in the logical storage area 112 by determining the first possible non-empty element in the logical storage area 112 from the lookup table 108. Additionally, there is no need to update the lookup table 108 while performing a deletion operation.

In certain embodiments, various database operations, such as, deletions, insertions, queries may be performed on range clustered tables by skipping over empty regions of the range clustered table. Additionally, a locking of a single element corresponding to a row of the range clustered table can lock contiguous empty elements starting from the first element stored in the logical storage area 108. As a result, a plurality of elements may be locked for exclusive or shared access by locking a single element. Certain embodiments decrease processing time for operations on a range clustered table by decreasing the number of locks and by decreasing the number of elements to examine by skipping over empty elements.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 8:
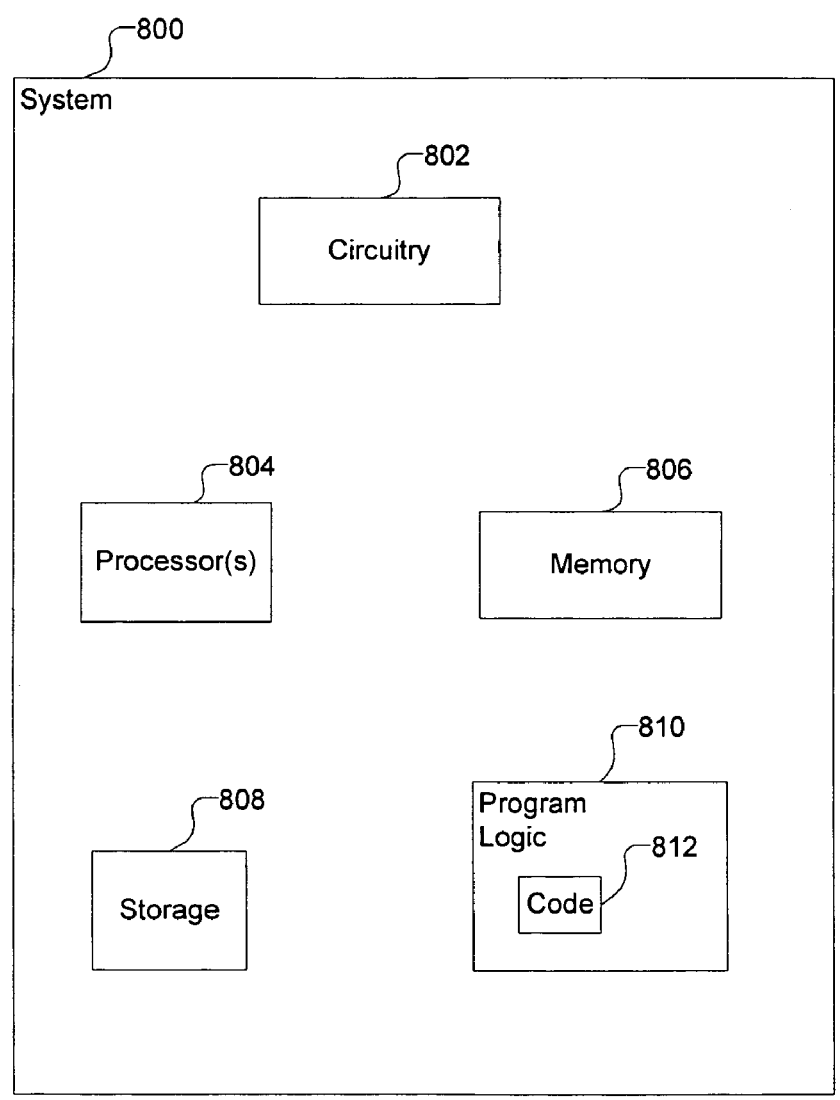
FIG. 8 illustrates a system in which certain embodiments are implemented.

FIG. 8 illustrates a block diagram of a system 800 in which certain embodiments may be implemented. In certain embodiments, the computational device 102 may be implemented in accordance with the system 800. The system 800 may include a circuitry 802 that may in certain embodiments include a processor 804. The system 800 may also include a memory 806 (e.g., a volatile memory device), and storage 808. Certain elements of the system 800 may or may not be found in the computational device 102. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

At least certain of the operations of FIGS. 5, 6, 7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for operating on a range clustered table in a database, the method comprising:

allocating, by a processor, a plurality of elements in logical storage, wherein the plurality of elements correspond to entries of the range clustered table, and wherein the allocating comprises preallocating space for the plurality of elements in the logical storage and mapping empty entries of the range clustered table to contiguously allocated empty elements in the logical storage, wherein each record in the range clustered table has a predetermined offset from a logical start of the range clustered table, and wherein the range clustered table is accessed without needing an index;

maintaining an indicator corresponding to the contiguously allocated empty elements in the plurality of elements; and performing an operation on the range clustered table by skipping over the contiguously allocated empty elements in the logical storage by using a lookup table that stores a pointer to a first possible non-empty element of the allocated plurality of elements, wherein all elements allocated in a sequence before the first possible non-empty element are empty, wherein a processing time for operations on the range clustered table is decreased by decreasing a number of the plurality of allocated elements to examine by skipping over the contiguously allocated empty elements, wherein the operation is an insertion operation, and wherein the performing of the insertion operation further comprises:
   (i) determining whether a first element of the plurality of elements is locked;
   (ii) in response to determining that the first element is not locked, generating an exclusive lock on the first element of the plurality of elements, wherein the exclusive lock exclusively locks the contiguously allocated empty elements starting from the first element;
   (iii) inserting data into one of the plurality of elements; and
   (iv) updating the indicator, in response to the inserting of the data.

2. The method of claim 1, wherein the operation is a query operation, wherein the performing of the query operation further comprises:
   determining whether the first element of the plurality of elements is locked;
   generating a shared lock on the first element of the plurality of elements, in response to determining that the first element is not locked, wherein the shared lock locks the contiguously allocated empty elements starting from the first element for shared access, and wherein the shared lock allows other query operations except for deletion and insertion operations to be performed on any locked elements;
   using the indicator to skip the contiguously allocated empty elements; and
   updating the indicator and responding to the query operation.

3. The method of claim 1, wherein the operation is a deletion operation, wherein the performing of the deletion operation further comprises:
   determining from the indicator a first possible non-empty element in the plurality of elements;
   scanning the plurality of elements staffing from the first possible non-empty element, wherein the lookup table guarantees that entries before the first possible non-empty elements are all empty; and
   deleting data corresponding to one element of the plurality of elements.

4. The method of claim 1, further comprising:
   locking a single element of the contiguously allocated empty elements to lock all elements of the contiguously allocated empty elements, wherein the locking ensures exclusive access.

5. The method of claim 3, wherein the processing time for the operations on the range clustered table is decreased by decreasing a number of locks on the range clustered table by locking selected elements of the plurality of elements together.

6. A system for operating on a range clustered table in a database, the system comprising:
   memory; and
   processor coupled to the memory, wherein the processor is configured to:
      allocate a plurality of elements in logical storage, wherein the plurality of elements correspond to entries of the range clustered table, and wherein the allocating comprises preallocating space for the plurality of elements in the logical storage and mapping empty entries of the range clustered table to contiguously allocated empty elements in the logical storage, wherein each record in the range clustered table has a predetermined offset from a logical start of the range clustered table, and wherein the range clustered table is accessed without needing an index;
      maintain an indicator corresponding to the contiguously allocated empty elements in the plurality of elements; and
      perform an operation on the range clustered table by skipping over the contiguously allocated empty elements in the logical storage by using a lookup table that stores a pointer to a first possible non-empty element of the allocated plurality of elements, wherein all elements allocated in a sequence before the first possible non-empty element are empty, wherein a processing time for operations on the range clustered table is decreased by decreasing a number of the plurality of allocated elements to examine by skipping over the contiguously allocated empty elements, wherein the operation is an insertion operation, and wherein the performing of the insertion operation further comprises:
         (i) determining whether a first element of the plurality of elements is locked;
         (ii) in response to determining that the first element is not locked, generating an exclusive lock on the first element of the plurality of elements, wherein the exclusive lock exclusively locks the contiguously allocated empty elements starting from the first element;
         (iii) inserting data into one of the plurality of elements; and
         (iv) updating the indicator, in response to the inserting of the data.

7. The system of claim 6, wherein the operation is a query operation, wherein the performing of the query operation further comprises:
   determining whether the first element of the plurality of elements is locked;
   generating a shared lock on the first element of the plurality of elements, in response to determining that the first element is not locked, wherein the shared lock locks the contiguously allocated empty elements starting from the first element for shared access, and wherein the shared lock allows other query operations except for deletion and insertion operations to be performed on any locked elements;
   using the indicator to skip the contiguously allocated empty elements; and
   updating the indicator and responding to the query operation.

8. The system of claim 6, wherein the operation is a deletion operation, wherein the performing of the deletion operation further comprises:
   determining from the indicator a first possible non-empty element in the plurality of elements;
   scanning the plurality of elements starting from the first possible non-empty element, wherein the lookup table guarantees that entries before the first possible non-empty elements are all empty; and
   deleting data corresponding to one element of the plurality of elements.

9. The system of claim 8, wherein the processing time for the operations on the range clustered table is decreased by decreasing a number of locks on the range clustered table by locking selected elements of the plurality of elements together.

10. The system of claim 6, wherein the processor is further configured to:
   lock a single element of the contiguously allocated empty elements to lock all elements of the contiguously allocated empty elements, wherein the locking ensures exclusive access.

11. A computer readable storage medium including code for operating on a range clustered table in a database, wherein the code when executed on a processor performs operations to:
   allocate, by the processor, a plurality of elements in logical storage, wherein the plurality of elements correspond to entries of the range clustered table, and wherein the allocating comprises preallocating space for the plurality of elements in the logical storage and mapping empty entries of the range clustered table to contiguously allocated empty elements in the logical storage, wherein each record in the range clustered table has a predetermined offset from a logical start of the range clustered table, and wherein the range clustered table is accessed without needing an index;
   maintain an indicator corresponding to the contiguously allocated empty elements in the plurality of elements; and
   perform an operation on the range clustered table by skipping over the contiguously allocated empty elements in the logical storage by using a lookup table that stores a pointer to a first possible non-empty element of the allocated plurality of elements, wherein all elements allocated in a sequence before the first possible non-empty element are empty, wherein a processing time for operations on the range clustered table is decreased by decreasing a number of the plurality of allocated elements to examine by skipping over the contiguously allocated empty elements, wherein the operation is an insertion operation, and wherein the performing of the insertion operation further comprises:
   (i) determining whether a first element of the plurality of elements is locked;
   (ii) in response to determining that the first element is not locked, generating an exclusive lock on the first element of the plurality of elements, wherein the exclusive lock exclusively locks the contiguously allocated empty elements starting from the first element;
   (iii) inserting data into one of the plurality of elements; and
   (iv) updating the indicator, in response to the inserting of the data.

12. The computer readable storage medium of claim 11, wherein the operation is a query operation, wherein the performing of the query operation further comprises:
   determining whether the first element of the plurality of elements is locked;
   generating a shared lock on the first element of the plurality of elements, in response to determining that the first element is not locked, wherein the shared lock locks the contiguously allocated empty elements starting from the first element for shared access, and wherein the shared lock allows other query operations except for deletion and insertion operations to be performed on any locked elements;
   using the indicator to skip the contiguously allocated empty elements; and
   updating the indicator and responding to the query operation.

13. The computer readable storage medium of claim 11, wherein the operation is a deletion operation, wherein the performing of the deletion operation further comprises:
   determining from the indicator a first possible non-empty element in the plurality of elements;
   scanning the plurality of elements staffing from the first possible non-empty element, wherein the lookup table guarantees that entries before the first possible non-empty elements are all empty; and
   deleting data corresponding to one element of the plurality of elements.

14. The computer readable storage medium of claim 13, wherein the processing time for the operations on the range clustered table is decreased by decreasing a number of locks on the range clustered table by locking selected elements of the plurality of elements together.

15. The computer readable storage medium of claim 11, wherein the code when executed on the processor further performs operations to:
   lock a single element of the contiguously allocated empty elements to lock all elements of the contiguously allocated empty elements, wherein the locking ensures exclusive access.

* * * * *